US006658975B2

(12) United States Patent
Schinelli

(10) Patent No.: US 6,658,975 B2
(45) Date of Patent: Dec. 9, 2003

(54) CUTTING ROLLER IN A LABELING MACHINE WITH THE CONTINUOUS INTRODUCTION OF A REELED FILM OF LABELS

(75) Inventor: Nicola Schinelli, Mantova (IT)

(73) Assignee: SIG Alfa S.p.A., Mantova (MN) (IT)

( * ) Notice: Subject to any disclaimer, the term of this patent is extended or adjusted under 35 U.S.C. 154(b) by 214 days.

(21) Appl. No.: 09/733,417

(22) Filed: Dec. 8, 2000

(65) Prior Publication Data

US 2001/0054343 A1 Dec. 27, 2001

(30) Foreign Application Priority Data

Jun. 27, 2000 (IT) .................................... PR2000A0040

(51) Int. Cl.[7] ................................................ F16C 37/00
(52) U.S. Cl. ............................ 83/171; 83/663; 384/476
(58) Field of Search .......................... 83/171, 663, 664, 83/665; 384/476, 320, 321

(56) References Cited

U.S. PATENT DOCUMENTS

| | | | | | |
|---|---|---|---|---|---|
| 1,725,740 | A | * | 8/1929 | Schutle | 384/320 |
| 2,281,971 | A | * | 5/1942 | Goddard | 384/476 |
| 2,352,206 | A | * | 6/1944 | Kendall | 384/476 |
| 2,380,747 | A | * | 7/1945 | Goetze | 82/149 |
| 2,893,703 | A | * | 7/1959 | Richardson | 384/321 |
| 3,604,769 | A | * | 9/1971 | Latham, Jr. | 384/476 |
| 3,674,355 | A | * | 7/1972 | Yearout et al. | 384/110 |
| 4,402,559 | A | * | 9/1983 | Shibata et al. | 384/320 |
| 4,602,874 | A | * | 7/1986 | Neugebauer | 384/476 |
| 4,934,838 | A | * | 6/1990 | Morner | 384/476 |
| 4,948,269 | A | * | 8/1990 | Hamilton | 384/467 |
| 5,058,496 | A | * | 10/1991 | Wittkopf | 384/467 |
| 5,130,585 | A | * | 7/1992 | Iwamatsu et al. | 310/59 |
| 5,192,139 | A | * | 3/1993 | Hiramoto et al. | 384/476 |
| 6,044,887 | A | * | 4/2000 | Orlandi et al. | 156/521 |
| 6,050,254 | A | * | 4/2000 | Egglhuber | 125/16.02 |
| 6,149,306 | A | * | 11/2000 | Zosi | 384/107 |
| 6,230,597 | B1 | * | 5/2001 | Baba et al. | 83/171 |

FOREIGN PATENT DOCUMENTS

| | | | |
|---|---|---|---|
| DE | 4015241 | 11/1991 | B23Q/1/08 |
| EP | 0 872 424 A2 | 10/1998 | B65C/9/18 |
| EP | 0 872 424 A3 | 1/1999 | B65C/9/18 |

* cited by examiner

*Primary Examiner*—Stephen Choi
(74) *Attorney, Agent, or Firm*—Michael Best & Friedrich LLC

(57) ABSTRACT

The invention falls within the field of labeling machine with the continuous introduction of a reeled label film. In particular, it relates to the cutting roller of the label film and it comprises a cooling line for the two support systems of the shaft of the cutting roller. The cooling line is preferably independent for each of the two systems and it comprises a probe for measuring the temperature of the related support which sends its measured value to a block for its comparison with a pre-set preferential temperature value. The block, according to the compared value, activates a solenoid valve inserted on the compressed air supply circuit.

5 Claims, 3 Drawing Sheets

CUTTING ROLLER IN A LABELING MACHINE WITH THE CONTINUOUS INTRODUCTION OF A REELED FILM OF LABELS

BACKGROUND OF THE INVENTION

The present invention relates to a cutting roller in a labeling machine with the continuous introduction of a reeled film of labels. In particular, the cutting roller finds its most extensive use to cut into segments or labels a thin film of polypropylene or PVC or plastic film in general whereon are printed the images and data constituting the label. It could nonetheless also be used for films made of other materials, for instance paper. Labeling machines that employ label films generally comprise:

- an assembly for unwinding the reeled film;
- a cutting assembly constituted by a vertical blade mounted on a roller rotating about a vertical axis, which in the technical jargon is called cutting roller, and by a fixed vertical counter-blade;
- a drum for picking up and transferring the cut label towards a roller for spreading the glue which intervenes in predetermined areas of the label and subsequently on the container whereon the label itself is to be applied.

Both the cutting roller, bearing the blade, and the pick-up drum are provided internal chambers in which a vacuum is created and which communicate through a plurality of holes with the outer surface of the cutting roller or of the drum to attract and hold the labels while they are cut and transferred onto the drum and to retain them on the drum itself.

The cutting of the film, which in some cases has a thickness of a few hundredths of a millimeter, presents several problems due mainly to the flexion or deformation of the support of the cutting roller. Said flexion or deformation occurs mainly because of the inconsistent and inconstant heat expansions in the whole cutting roller. In particular, it is evident that at the start of the work process the supports of the cutting roller have low temperatures which progressively increase as the hours of work increase, so that one is forced to adjust the position of the counter-blade during the working period.

To overcome the aforesaid drawback, the same Applicant has provided a cutting roller (protected by Italian industrial invention Patent No. 1294078) which comprises ducts able to carry oil, heated at a temperature exceeding that of the external environment by about 20–30° C., into the roller support frame. These ducts allow for heating said support frame to a temperature of about 50° C. before starting the labeling cycle and for maintaining said temperature during the work of the machine.

SUMMARY OF THE INVENTION

The aim of the present invention is to eliminate the aforesaid drawbacks and to make available a cutting roller provided with a cooling system able to maintain constant the temperature of the supports of the cutting roller, exploiting compressed air at ambient temperature. A first advantage is thereby obtained of not having heating systems with the consequent lower operating costs. A second advantage consists of the lack of costly seal elements, with no leakage problems, since the cooling fluid is air.

Said aims are fully achieved by the cutting roller in a labeling machine with the continuous introduction of a reeled film of labels, constituting the subject of the present invention, which is characterized by the contents of the claims set out below.

In particular, the cutting roller comprises, in correspondence with the two supports of its rotation shaft, ducts wherein compressed air at ambient temperature is sent. In correspondence with said supports are provided temperature detection probes which activate or inhibit the flow of air by acting on appropriate solenoid valves inserted on the compressed air supply line.

BRIEF DESCRIPTION OF THE DRAWINGS

This and other features shall become more readily apparent from the following description of a preferred embodiment illustrated, purely by way of non limiting example, in the accompanying drawing tables, in which.

DESCRIPTION OF THE PREFERRED EMBODIMENT

Figure 1:
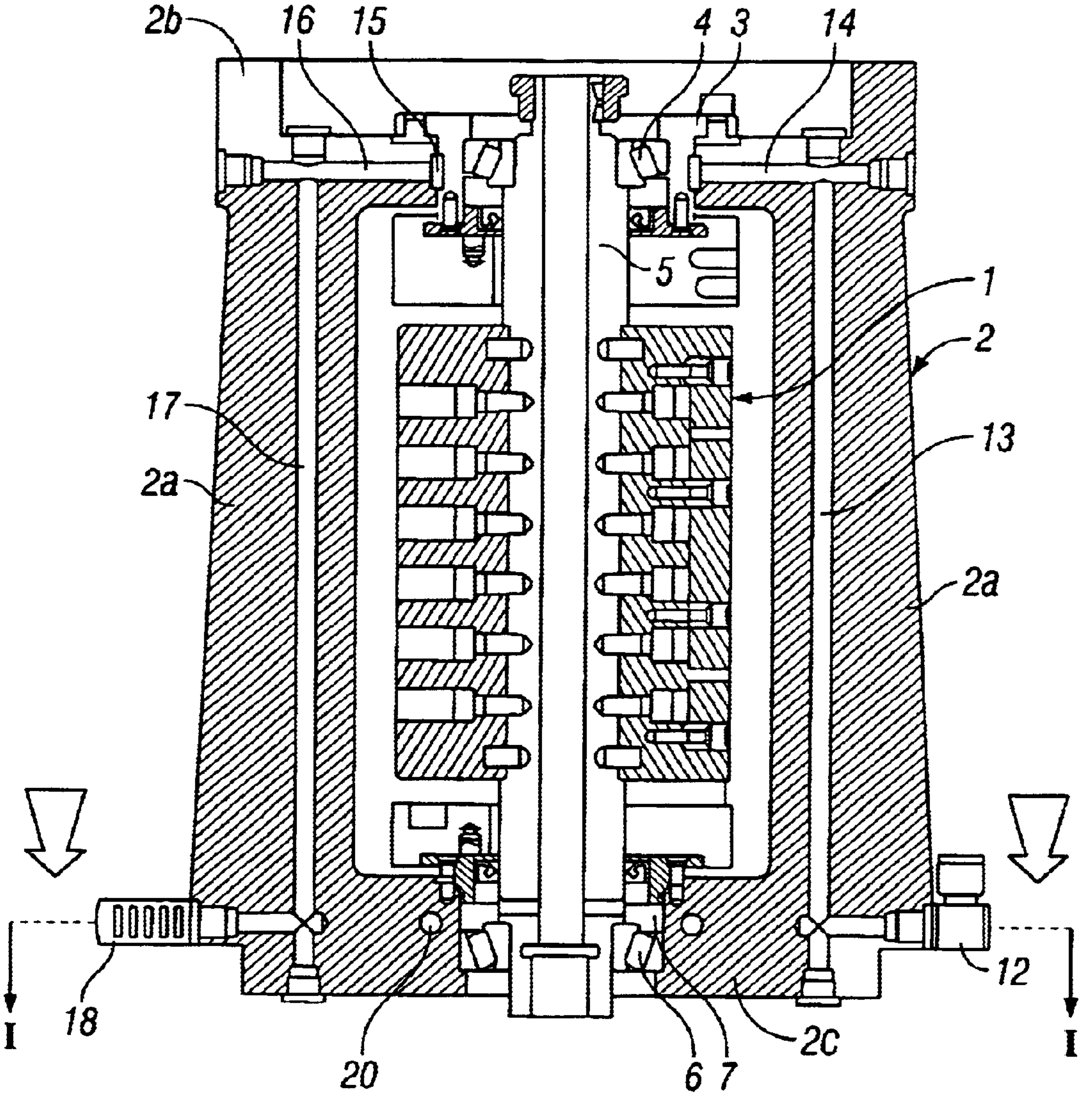
FIG. 1 shows a cutting roller in a vertical section.

With reference to the figures, the reference number 1 globally indicates a cutting roller of essentially cylindrical shape and whereon are mounted systems for locking a blade of a known type, not shown herein. The cutting roller 1 is supported by a portal shaped frame 2, i.e. comprising two columns 2*a* and two cross members, an upper one 2*b* and a lower one 2*c*. In the upper cross member 2*b* is inserted a bushing 3 in which is inserted a bearing 4 that supports a motorized shaft 5 whereon is keyed the cutting roller 1.

Figure 3:
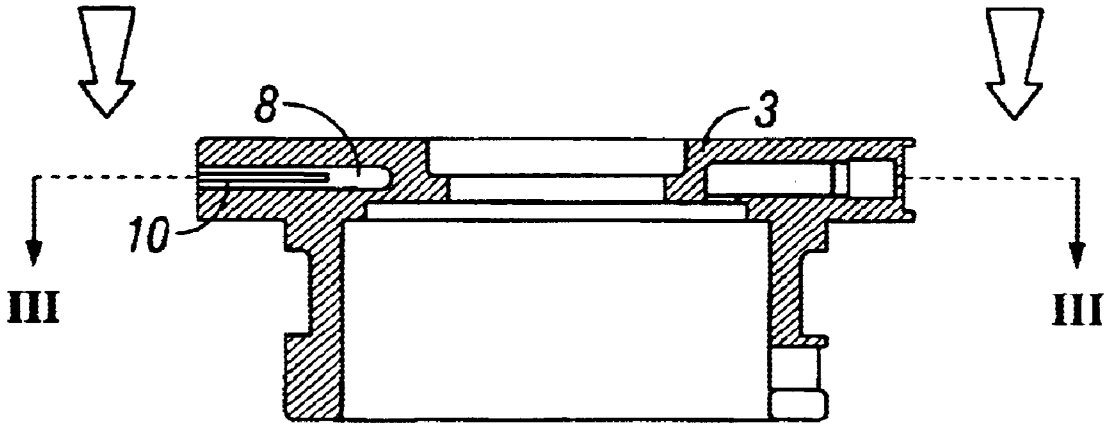
FIG. 3 shows a longitudinal section view of the upper support of the cutting roller shaft.
Figure 4:
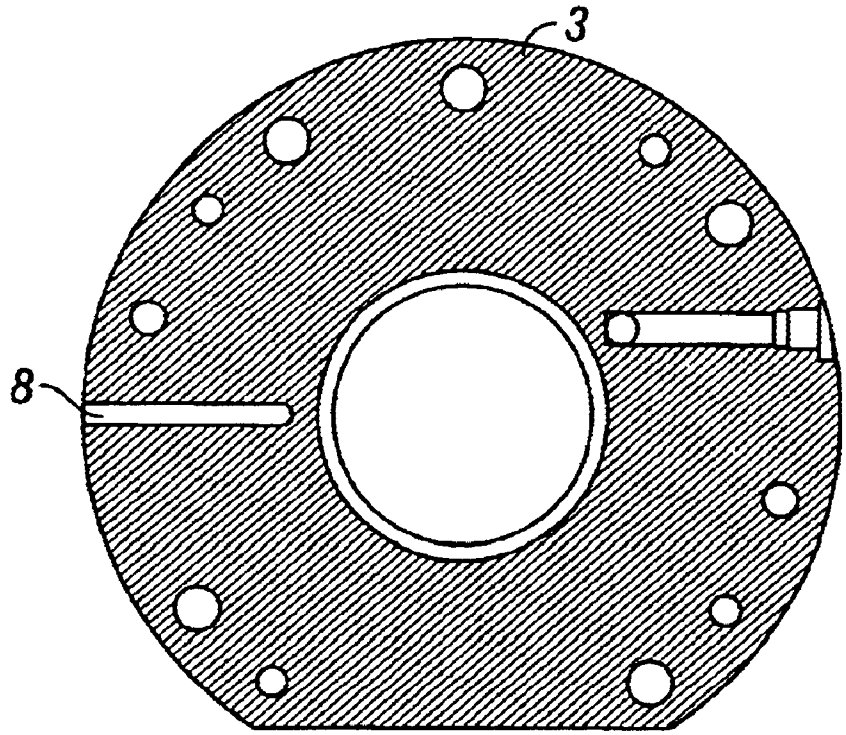
FIG. 4 shows the support of the cutting shaft according to section 3—3 of FIG. 3.

Inferiorly to the shaft 5 is inserted a bearing 6 housed in a seat 7 obtained in the lower cross member 2*c*. In the bushing 3 is provided, as better shown in FIG. 3, a hole 8 in which is inserted a probe 10, of a known kind, for measuring the temperature of the bushing itself. In the lower cross member 2*c* is provided another hole 9 for the insertion of a probe 11, of a known kind, for measuring the temperature in correspondence with the seat 7 of the bearing 6. In the lower cross member 2*c* is provided an inlet 12 for compressed air which feeds a duct 13 that rises along one of the columns 2*a* and feeds a horizontal duct 14 which ends in an annular chamber 15 encompassing the whole bushing 3. Another horizontal duct 16 coming from the annular chamber 15 is connected with a vertical duct 17 obtained in the other column 2*a* and discharging into the external environment through a known silencing device 18. A first compressed air line is thereby created which thus provides for cooling the upper support system of the cutting roller shaft. Inferiorly directly in the lower cross member 2*c* is provided a second compressed air inlet 19 connected with a second line 20 which encompasses the seat 7 of the bearing 6. The compressed air that is sent into the second line 20 exits through a silencing device 21. The second circuit 20 supplied with compressed air therefore serves the function of cooling the seat of the bearing 6.

Both bearings 4 and 6 are lubricated by greasing.

It has been observed that the ideal temperature whereto bushing 3 and seat 7 need to be maintained lies in a range between 35 and 50° C. Hence, a device is provided for controlling and maintaining the ideal temperature which is pre-set at the start of the working cycle also according to the type of material constituting the label film. The control device comprises the two probes 10 and 11 which measure the temperature respectively of the bushing 3 and of the seat 7 and transmit the measured value to a comparison block 22 whereon the ideal temperature value is pre-set. If the measured temperature exceeds the value of ideal temperature, the comparing block acts on a solenoid valve 23 which opens the compressed air line, thereby starting to blow cooling air. The cooling line for the bushing 3 is fully independent from the cooling line for the seat 7 so that cooling can act either simultaneously or independently on bushing 3 and/or seat 7.

Lastly, the bushing 3 with related bearing 4 and the seat 7 with related bearing 6 constitute two support systems which are maintained at a pre-set constant temperature by at least a compressed air cooling line.

Figure 2:
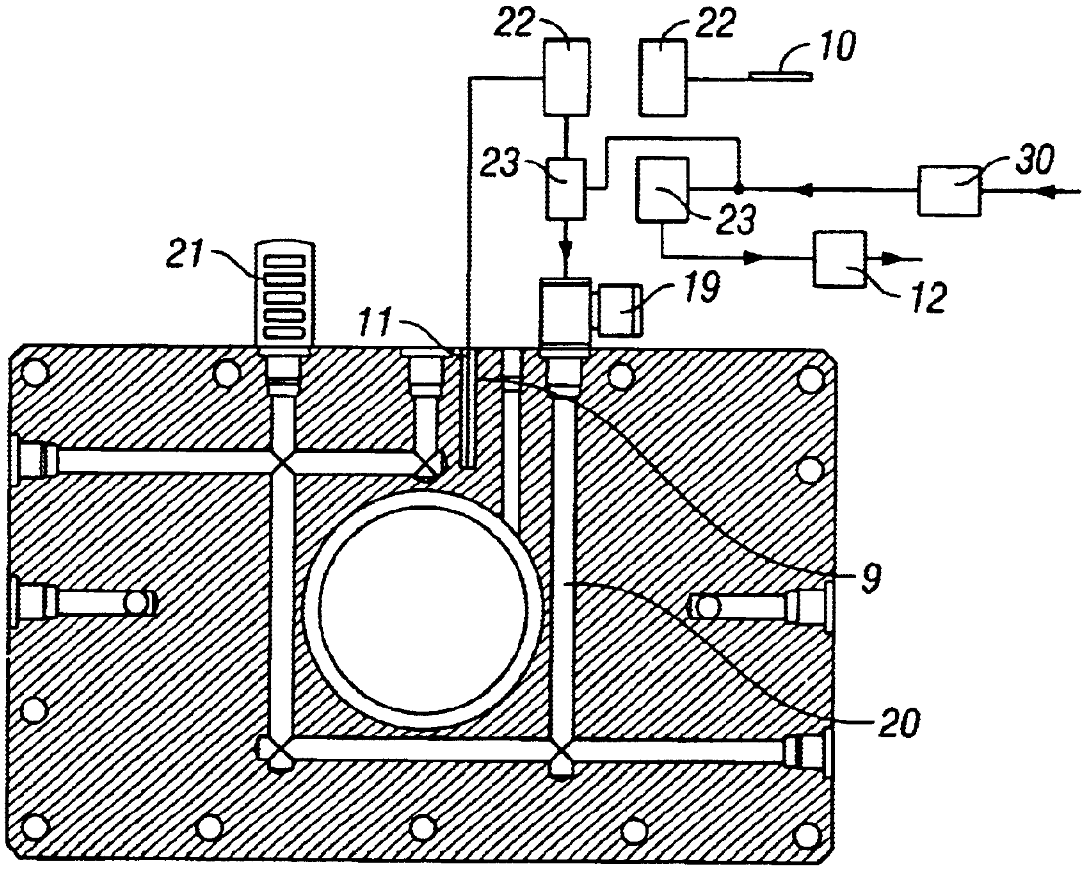
FIG. 2 shows the cutting roller in the section I—I of FIG. 1.

In the description, specific reference has been made to two independent compressed air cooling lines, but it is evident that the circuit could also be a single one, shared by the upper bushing 3 and by the seat 7, and it is obvious that in this case the ability independently to control temperatures in two points will not be available. The compressed air used is air at ambient temperature but, according to a possible variation shown in FIG. 2, compressed air may also be cooled by means of a heat exchanger 30 before its entry into the cooling line. The cutting roller 1 described above therefore has the following advantages:

- use of compressed air, whose intervention is not constant but commanded only under determined temperature circumstances, hence with limited operating costs;
- practically non-existent or utterly minor sealing systems;
- possibility to adjust temperatures on the upper support systems independently from the lower support system;
- better control over the temperature of the bearings which could have different heating due to different greasing.

What is claimed:

1. A labeling machine with continuous introduction of a reeled film of labels, the labeling machine comprising:

a motorized shaft;

a cutting roller mounted on the motorized shaft; and a frame including

- an upper support and a lower support for the motorized shaft;
- a first compressed air line for cooling the upper support of the motorized shaft;
- a second compressed air line for cooling the lower support of the motorized shaft;
- a pair of temperature measuring probes for measuring the temperature of each of the supports, respectively;
- a solenoid valve which opens or closes each of the compressed air lines, respectively; and
- a temperature controller for comparing the temperatures measured by each of the measuring probes with a pre-set temperature value and for actuating the solenoid valve based on the comparison.

2. The labeling machine of claim 1 in which the upper support includes a bushing that defines an annular chamber and the compressed air line for cooling the upper support communicates with the annular chamber.

3. The machine of claim 1 in which at least one of the compressed air lines for cooling the supports includes a heat exchanger for cooling air, the heat exchanger having an air outlet suitable for passing cooled air to the compressed air line.

4. The labeling machine of claim 1 in which the compressed air line defines a chamber that substantially surrounds the motorized shaft.

5. The labeling machine of claim 1 which includes a bearing for the shaft, the bearing being lubricated with grease.

* * * * *